United States Patent

Tseng et al.

[11] Patent Number: 5,831,749
[45] Date of Patent: Nov. 3, 1998

[54] OPTICAL SCANNING APPARATUS

[75] Inventors: Kou-Lung Tseng, Hsinchu; Wei-Hsin Hwang, HsinChu County; Shih-Min Lo, Taichung County; Chien-Chin Chan, Hsinchu County, all of Taiwan

[73] Assignee: Umax Data Systems Inc., Hsinchu, Taiwan

[21] Appl. No.: 755,884

[22] Filed: Dec. 2, 1996

[51] Int. Cl.$^6$ .................................................. H04N 1/04
[52] U.S. Cl. ........................... 358/474; 358/494; 358/497
[58] Field of Search ..................... 358/497, 494, 358/474, 471, 409, 412, 505, 506, 487, 475, 496, 401, 501; 250/235, 234, 208.1, 236; 399/1, 130

[56] References Cited

U.S. PATENT DOCUMENTS

| | | | |
|---|---|---|---|
| 4,620,234 | 10/1986 | Watanabe | 358/497 |
| 4,933,753 | 6/1990 | Watanabe | 358/494 |
| 5,221,974 | 6/1993 | Kusumoto et al. | 358/474 |
| 5,260,811 | 11/1993 | Morikawa | 358/474 |
| 5,285,294 | 2/1994 | Takeuchi | 358/474 |
| 5,289,000 | 2/1994 | Tayofuku | 358/497 |
| 5,379,095 | 1/1995 | Oishi | 358/497 |
| 5,392,100 | 2/1995 | Yoshida | 358/494 |
| 5,708,516 | 1/1998 | Lin | 358/494 |
| 5,717,503 | 2/1998 | Chien | 358/474 |
| 5,734,758 | 3/1998 | Yamamoto et al. | 358/474 |

*Primary Examiner*—Kim Yen Vu
*Assistant Examiner*—Cheukfan Lee
*Attorney, Agent, or Firm*—Kenyon & Kenyon

[57] ABSTRACT

An optical scanning apparatus including a first optical unit and a second optical unit used to illuminate a document and direct the reflected light via a lens unit to the light sensing device; a movement mechanism used to move the first and second optical units in such a way that the optical path from the light source to the lens unit is always a fixed length. The movement mechanism includes a first driving unit having a first driving wheel, a first passive wheel, and a first transmission member coupling the first driving and passive wheels and affixed to the first optical unit; a second driving unit having a second driving wheel, a second passive wheel, and a second transmission member coupling the second driving and passive wheels and affixed to the second optical unit; and a driving motor. The diameter of the first driving wheel is of a predetermined multiple of that of the second driving wheel such that the optical path from the light source to the lens unit is always a fixed length.

11 Claims, 5 Drawing Sheets

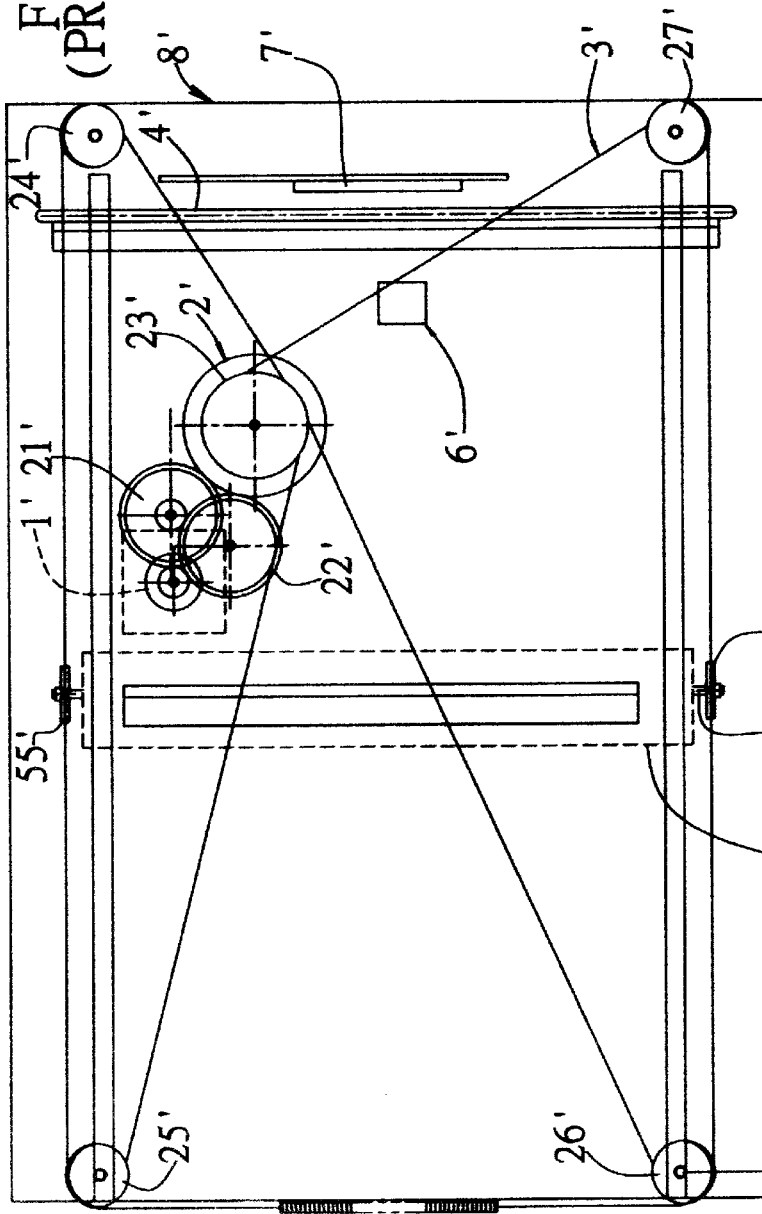
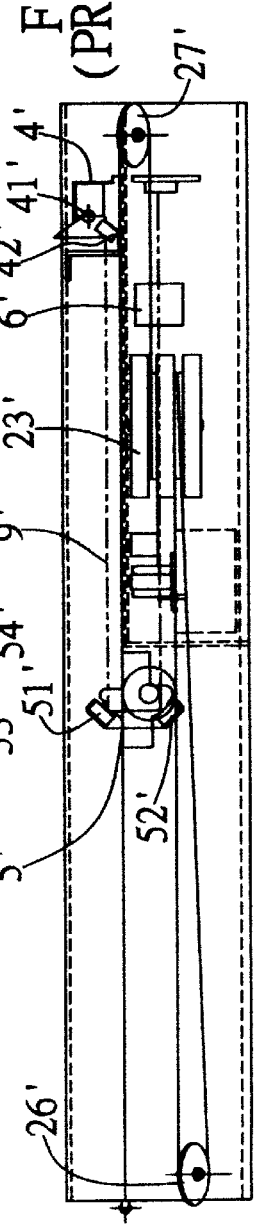
FIG. 1A (PRIOR ART)
FIG. 1B (PRIOR ART)

FIG. 3

OPTICAL SCANNING APPARATUS

BACKGROUND OF THE INVENTION

1. Field of the Invention

This invention relates to optical scanning apparatus (commonly called scanners), and more particularly, to an optical scanning apparatus with a lens unit, a light sensing device, and an improved movement mechanism for moving a pair of optical units comprising a light source used to scan over a document. The movement mechanism allows the optical path from the document to the lens unit to be always invariable any time during the scan, such that the light sensing device can receive all the line images from the lens unit with a constant object length.

2. Description of Related Art

Optical scanning apparatus is an input device that uses optical and light-sensing devices to scan printed documents or the like, so as to transform the data on the printed documents into digital signals that can be later manipulated by a computer. In flatbed scanners, a movement mechanism is used to move the optical devices beneath the document so as to make a scan over the document in a line-to-line manner.

FIG. 1 shows a conventional optical scanning apparatus which has a movement mechanism that includes a set of seven pulleys and a steel cord to move a first optical unit including a scan head and a mirror and a second optical unit including a set of mirrors for making an optical scan over the document. As shown, this conventional optical scanning apparatus includes a motor 1', a pulley set 2', a steel cord 3', a first optical unit 4', a second optical unit 5', and a casing 8'. The motor 1' drives a pair of deceleration gears 21', 22' which are meshed to a pulley 23'. By means of steel cord 3', the pulley 23' is coupled to pulleys 24', 25', 26', 27' for power transmission. Thus, the motor 1' can drive the whole pulley set 2' by way of the steel cord 3'. The first optical unit 4' includes a light source 41' and a first mirror 42', and has its two ends directly affixed to cord 3'; and the second optical unit 5' includes a second mirror 51' and a third mirror 52', and is coupled to the cord 3' by means of pulleys 54', 55' which are respectively attached to two ends of a rod 53' provided within the second optical unit 5'. The pulleys and cord are designed and arranged in such a way that the first optical unit 4' will move by a displacement two times the displacement of the second optical unit 5' during any period.

When the optical scanning apparatus is making a scan over a document, the light source 41' emits a light beam to illuminate the document. The reflected light from the document is then directed via the first mirror 42', the second mirror 51', the third mirror 52', and the lens unit 6' to be focused onto a light sensing device which converts the received light signal into electrical signal and subsequently to digital form for processing by computer.

Since the displacement of the first optical unit 4' is always twice the displacement of the second optical unit 5', the optical path 9' from the document to the light sensing device 7' at any point of the moving path of the first optical unit 4' can always be maintained at a fixed length. The document image thus can always be focused precisely on the light sensing device 7'. The images of all the scan lines over the document can thus be sharply received by the light sensing device 7'.

It is a drawback, however, to the foregoing conventional optical scanning apparatus that the arrangement of the cord and various sizes and orientations of the pulleys that are required to achieve the desired goal are quite complex and thus costly to implement. Moreover, the cord should be of high tension quality to meet the requirements, and the pulley set needs high power motor to drive it, which all contribute to the manufacturing cost of the foregoing conventional optical scanning apparatus. The complexity in the structure of the optical scanning apparatus not only makes it costly to manufacture, but also laborious and time-consuming to assemble and repair.

To solve the foregoing problem, the ROC Utility Model Patent Publication No. 277,794 discloses an optical scanning apparatus with an improved movement mechanism capable of moving the first optical unit always by a displacement twice the displacement of the second optical unit during any period. The number of components for this patented apparatus is less than the optical scanning apparatus of FIG. 1 so that it is easier and less costly to manufacture. However, since this patented apparatus utilizes only a single belt to drive the whole pulley set and the first and second optical units, the belt is subject to a heavy load that needs a more powerful motor to drive the belt. As a consequence, the belt can be easily broken so that its life of use is short.

Furthermore, in the patented apparatus the arrangement of the belt on a stationery pulley and a movable pulley is quite space-consuming. This makes the casing of the apparatus to be quite large, which is quite non-appealing to the consumers and thus less competitive on the market.

SUMMARY OF THE INVENTION

It is therefore a primary objective of the present invention to provide an optical scanning apparatus having a movement mechanism capable of allowing the optical path from the document to the light sensing device to be invariable in length all the time during a scan.

It is another objective of the present invention to provide an optical scanning apparatus having a movement mechanism which is less complex in structure so that the optical scanning apparatus is easy and less costly to manufacture.

It is still another objective of the present invention to provide an optical scanning apparatus with a movement mechanism which allows the optical scanning apparatus to be accommodated in a space-saving manner.

In accordance with the foregoing and other objectives of the present invention, a new optical scanning apparatus with an improved movement mechanism for moving optical units is provided. The optical scanning apparatus includes a casing, a movement mechanism mounted within the casing, a first optical unit and a second optical unit both coupled to the movement mechanism such that these optical units can slidably move along the length of the casing, and a lens unit and a light sensing device respectively mounted on the inner bottom surface of the casing.

The first optical unit includes a light source for generating light beam during a scan to illuminate the document to be scanned and a first mirror for reflecting the light beam emitted from the light source to the second optical unit. And, the second optical unit includes a second mirror and a third mirror for reflecting the light beam transmitted from the first optical unit to the lens unit. The light sensing device then coverts light beam received from the lens unit into electrical signal for output.

The movement mechanism is used to move the first optical unit and the second optical unit. The movement mechanism includes a first driving means to which the first optical unit is attached, a second driving means to which the second optical unit is attached, and a power means for driving the first driving means and the second driving means. The first driving means comprises a first driving wheel connected to the power means, a first passive wheel having a diameter equal to that of the driving wheel, and a first transmission member coupling the first driving wheel and the first passive wheel; and the second driving means comprises a second driving wheel connected to the power means, a second passive wheel having a diameter equal to that of the second driving wheel, and a second transmission member coupling the second driving wheel and the second passive wheel. In addition, the diameter of the first driving wheel is of a predetermined multiple of the diameter of the second driving wheel. Therefore, when the power means such as a step motor is coupled to the movement mechanism for driving the first driving wheel and the second driving wheel to thereby move the first optical unit and the second optical unit, the displacement of the first optical unit is of the predetermined multiple of the displacement of the second optical unit.

With the foregoing movement mechanism, the overall optical path from the document to the lens unit is always maintained at a constant length during the scan when the first optical unit moves from the starting point to the ending point.

BRIEF DESCRIPTION OF DRAWINGS

The invention can be fully understood from the following detailed description of the preferred embodiments, with reference made to the accompanying drawings, wherein:

FIGS. 1A and 1B are a top view and a side view of a flatbed scanner with a conventional movement mechanism respectively;

FIG. 3 is a top view of the optical scanning apparatus according to the present invention;

DETAILED DESCRIPTION OF PREFERRED EMBODIMENT

Figure 2:
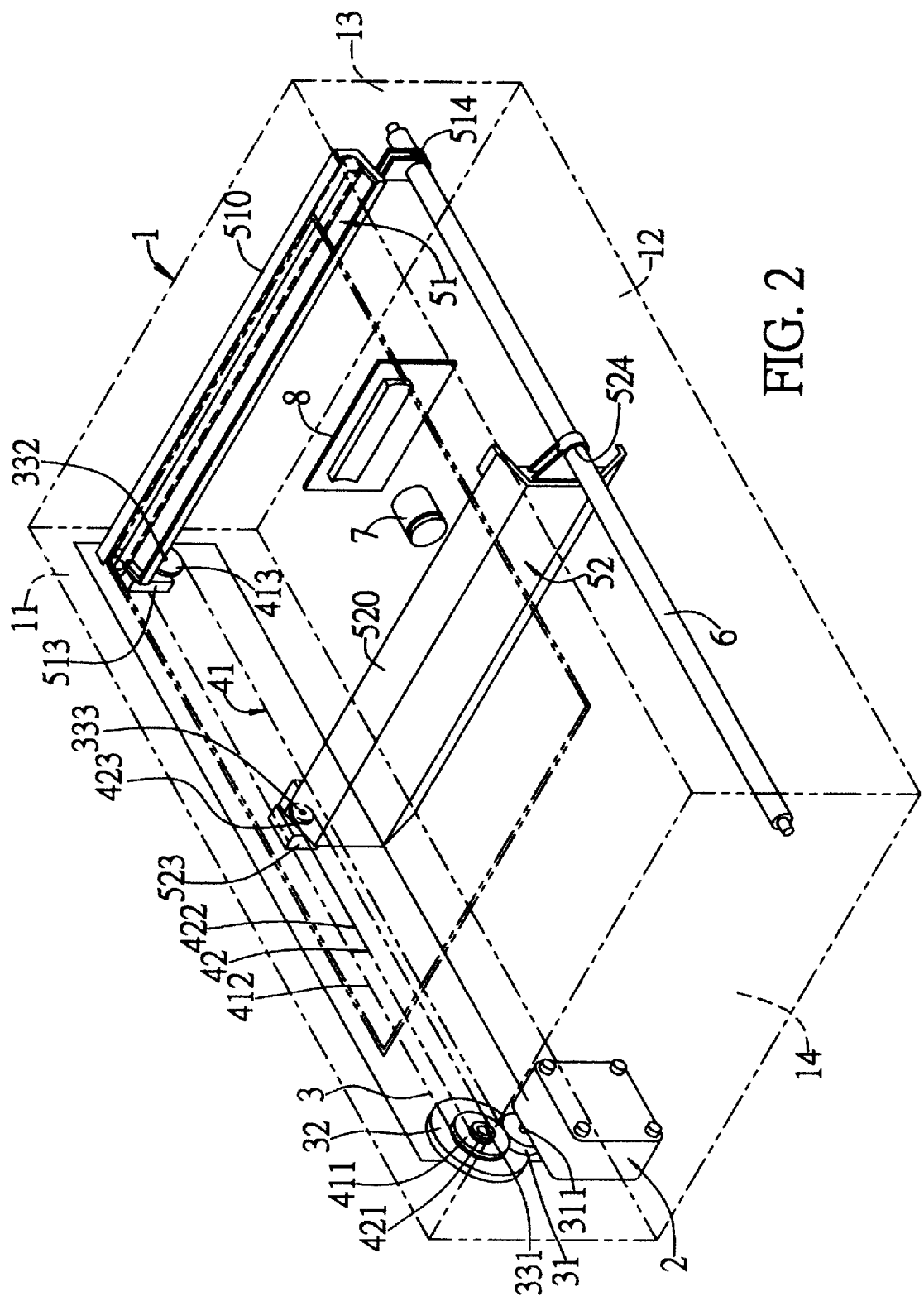
FIG. 2 is a perspective view of the optical scanning apparatus according to the present invention.
Figure 3:
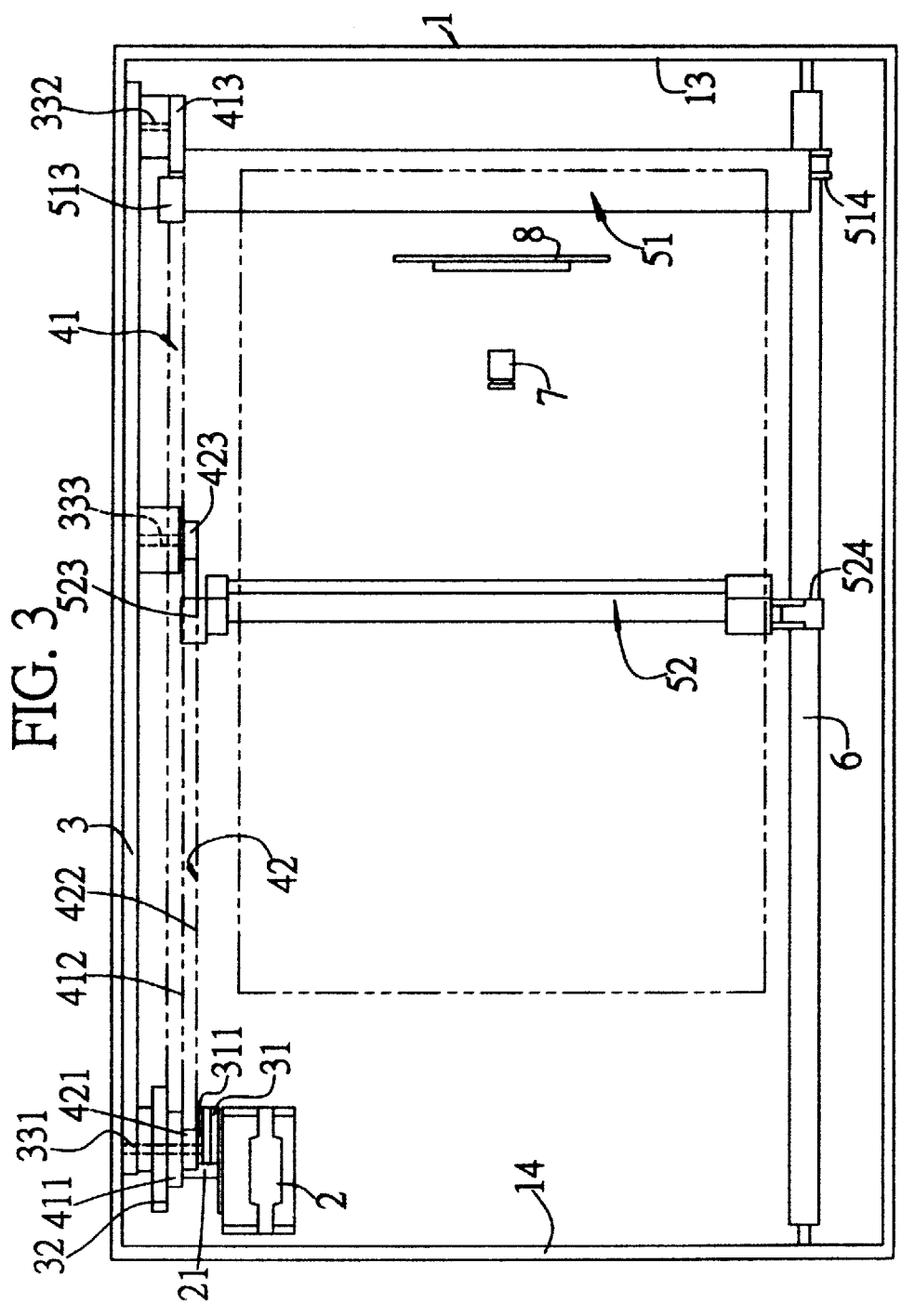

Referring to FIGS. 2 and 3, the optical scanning apparatus according to the present invention includes a casing 1, a step motor 2 mounted in the casing 1, a pulley mount 3 secured to a wall 11 of the casing 1, a first driving unit 41 attached to the step motor 2, a second driving unit 42 attached to the step motor 2, a first optical unit 51 affixed to the first driving unit 41, a second optical unit 52 affixed to the second driving unit 42, a guide bar 6 for guiding the first optical unit 51 and the second optical unit 52, a lens unit 7 mounted on the bottom 12 of the casing 1, and a light sensing device 8 mounted on the bottom 12 of the casing 1.

The step motor 2 has a shaft 21 meshed to a passive wheel 31, and the center axis of the passive wheel 31 is provided with a shaft 311 which is meshed to a transmission wheel 32. This allows the step motor 2 to transmit power via the passive wheel 31 to the transmission wheel 32 and allows the transmission wheel 32 to rotate in the same direction as the shaft 21 of the step motor 2.

A transmission shaft 331 is provided on the pulley mount 3 near the step motor 2, and a first passive shaft 332 and a second passive shaft 333 are respectively provided in the other end and the middle of the pulley mount 3. The transmission shaft 331, first passive shaft 332, and second passive shaft 333 are used to support the first driving unit 41 and the second driving unit 42.

The first driving unit 41 comprises a first driving wheel 411 fixed to the transmission shaft 331, a first passive wheel 413 fixed to the first passive shaft 332 and whose diameter is equal to that of the first driving wheel 411, and a first timing belt 412 coupling the first driving wheel 411 and the first passive wheel 413; and the second driving unit 42 includes a second driving wheel 421 fixed to the transmission shaft 331 and whose diameter is exactly half of that of the first driving wheel 411, a second passive wheel 423 fixed to the second passive shaft 333 and whose diameter is equal to that of the second driving wheel 421 and a second timing belt 422 coupling the second driving wheel 421 and the second passive wheel 423. The transmission wheel 32, first driving wheel 411, and second driving wheel 421 can be integrally formed and are fixed on the transmission shaft 331. They are used to allow the first driving wheel 411 and the second driving wheel 421 to start rotating exactly in synchronization with the transmission wheel 32.

The first timing belt 412 is adapted to wind around the first driving wheel 411 and first passive wheel 413 for transmitting power from the first driving wheel 411 to the first passive wheel 413; and the second timing belt 422 is adapted to wind around the second driving wheel 421 and the second passive wheel 423 for transmitting power from the second driving wheel 421 to the second passive wheel 423.

The optical scanning apparatus uses the step motor 2 to generate driving power which is transmitted via the passive wheel 31, transmission wheel 32, first driving wheel 411, and second driving wheel 421, so as to drive the first timing belt 412 and the second timing belt 422 to shift horizontally with a displacement ratio of 2:1.

Figure 4:
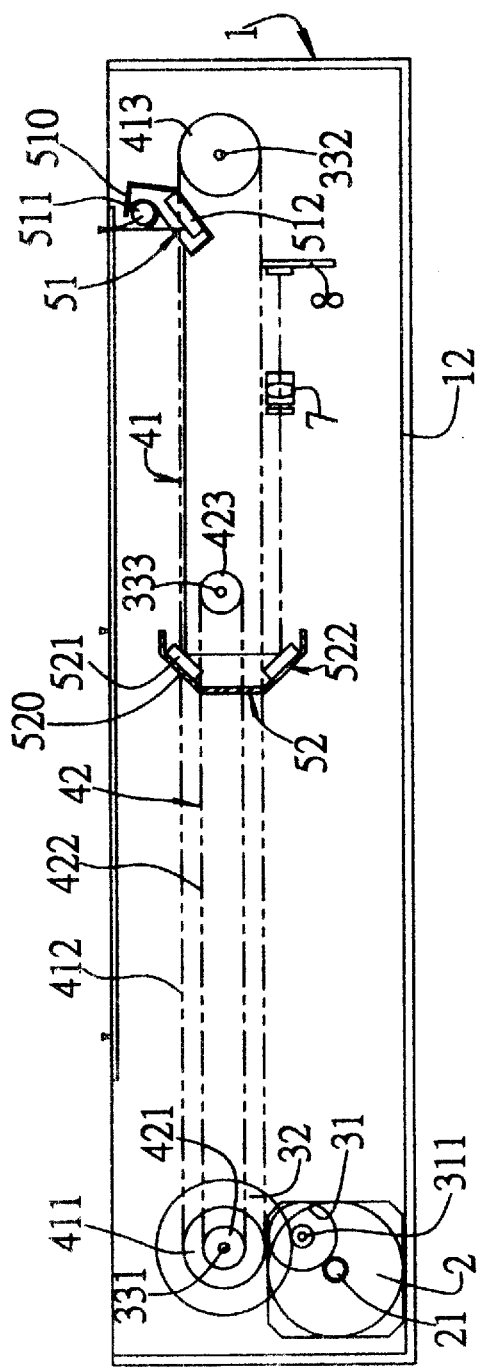
FIG. 4 is a side view of the optical scanning apparatus according to the present invention.

As shown in FIG. 4, the optical scanning apparatus includes a first optical unit 51 and a second optical unit 52. The first optical unit 51 comprises a first support panel 510, a light source 511 affixed on the first support panel 510, a first mirror 512 affixed on the first support panel 510, a first fixture 513 (see FIG. 3) attached to one end of the first support panel 510, and a first guide piece 514 (see FIG. 3) attached to the other end of the first support panel 510; and the second optical unit 52 comprises a second support panel 520, a second mirror 521 affixed on the second support panel 520, a third mirror 522 affixed on the second support panel 520, a second fixture 523 (see FIG. 3) attached to one end of the second support panel 520, and a second guide piece 524 (see FIG. 3) attached to the other end of the second support panel 520. The first fixture 513 is further affixed on the first timing belt 412, and the second fixture 523 is affixed on the second timing belt 422. The first guide piece 514 and second guide piece 524 receive a guide rod 6 which is secured between two opposite walls 13, 14 of the casing 1.

The light source 511 is used to generate a light beam to illuminate the document being scanned. The reflected light from the document is further transmitted via the first mirror 512, the second mirror 521, and the third mirror 522, and then focused by the lens unit 7 onto the light sensing device 8 to be photoelectrically converted into analog signal and subsequently to digital form corresponding to the information on the scanned document. The photo-electrical conversion of the light signal is a conventional technique so that a description thereof will not be further detailed.

Figure 5A:
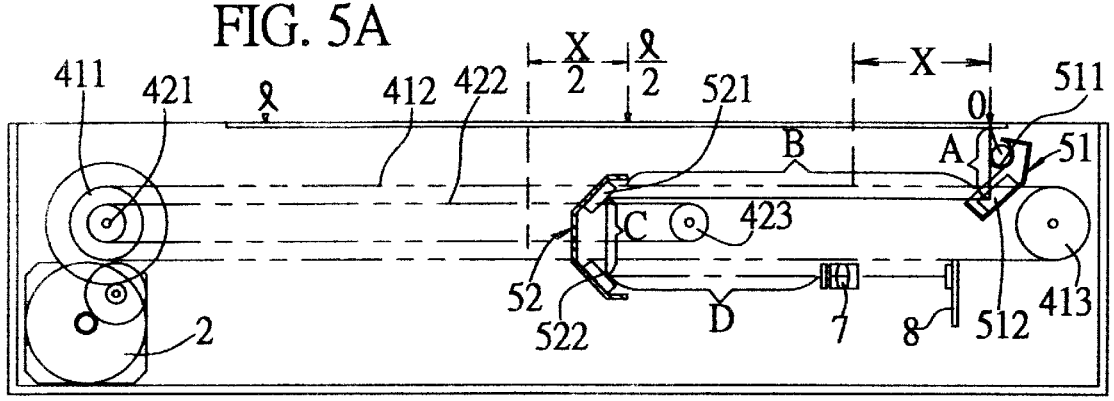
FIGS. 5A through 5C are three side views of the optical scanning apparatus according to the present invention, respectively showing the displacement of a first optical unit relative to a second optical unit.
Figure 5B:
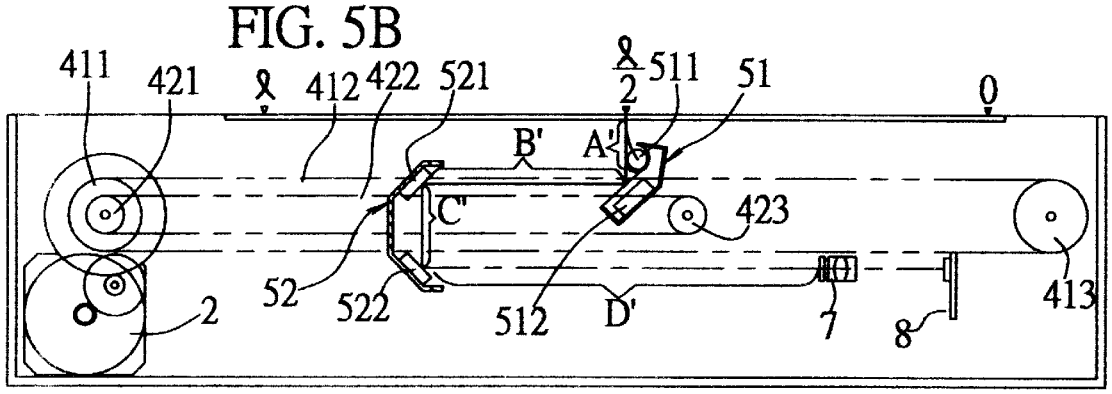
Figure 5C:
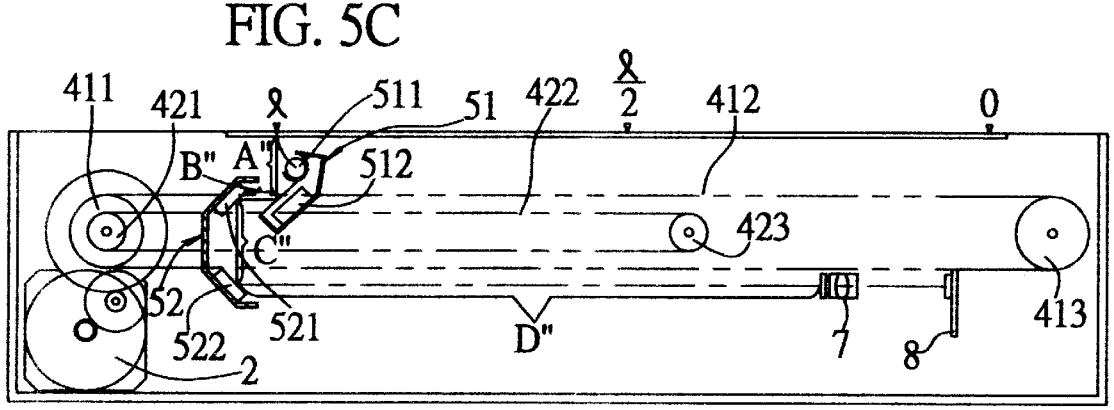

Referring to FIGS. 5A, 5B and 5C, in the optical scanning apparatus the scanning distance from the starting point to the ending point is 1. When the light source 511 emits a light beam to illuminate the document being scanned, the reflected light from the document, as described earlier, passes via the first mirror 512, the second mirror 521, and the third mirror 522 to the lens unit 7. It is required that the optical path from the document to the lens unit 7 be maintained at a fixed length.

In the optical path from the document to the lens unit 7, the vertical distance A from the document to the first mirror 512 and the vertical distance C from the second mirror 521 to the third mirror 522 are fixed. When the first optical unit 51 and second optical unit 52 move, the horizontal distance B from the first mirror 512 to the second mirror 521 and the horizontal distance D from the third mirror 522 to the lens unit 7 are varied. Therefore, in order to maintain the optical path from the document to the lens unit 7 to at a fixed length, B+D should be always a constant.

To let B+D always be a constant, the movement mechanism for the first optical unit 51 and second optical unit 52 should be designed in such a way that when the first optical unit 51 moves forward by a distance of X, the second optical unit 52 should be move forward only by a distance of X/2, i.e., the ratio of the displacement of the first optical unit 51 to the displacement of the second optical unit 52 should always be 2:1 at any time during the scan. The length of the optical path TT is as follows:

$$TT = A + (B - X + X/2) + C + (D + X/2)$$
$$= A + B + C + D$$

The ratio of 2:1 is determined by the ratio of the diameter of the first driving wheel 411 to the diameter of the second driving wheel 421.

As shown in FIG. 5B, when the first optical unit 51 moves from the starting point forward by a distance of ½, the optical path B' from the first mirror 512 to the second mirror 521 is B'=B−¼, and the optical path D' from the third mirror 522 to the lens unit 7 is D'=D+¼. The overall optical path TT' from the document to the lens unit 7 is thus:

$$TT' = A + (B - 1/4) + C + (D + 1/4)$$
$$= A + B + C + D$$

As shown in FIG. 5C, when the first optical unit 51 moves from the starting point forward by a distance of 1, the optical path B" from the first mirror 512 to the second mirror 521 is B'=B−½, and the optical path D" from the third mirror 522 to the lens unit 7 is D"=D+½. The overall optical path TT" from the document to the lens unit 7 is thus:

$$TT' = A + (B - 1/2) + C + (D + 1/2)$$
$$= A + B + C + D$$

Therefore, the overall optical path from the document to the lens unit 7 is always maintained at a constant length during the scan when the first optical unit 51 moves from the starting point to the ending point. As a result, the object length of the document image is always maintained at a fixed constant at any time during the scan, allowing all the line images of the document to be projected in focus on the light sensing device 8.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. An optical scanning apparatus, comprising:

a casing;

an optical means for scanning a document received by said casing, comprising a first optical unit and a second optical unit, wherein said first optical unit including a light source and a first mirror and said second optical unit including a plurality of mirrors, said light source generating a light beam to illuminate the document during a scan and the reflected light from the document passing through said first optical unit and said second optical unit;

a lens unit mounted on a bottom wall of said casing for focusing the light from said optical means;

a light sensing means, coupled to said optical means, for converting light signal from said lens unit to electrical signal; and a movement mechanism for moving said first optical unit and said second optical unit, including:

a first driving means including a first driving wheel, a first passive wheel, and a first transmission member coupling said first driving wheel and said first passive wheel and affixed to said first optical unit;

a second driving means including a second driving wheel, a second passive wheel, and a second transmission member coupling said second driving wheel and said second passive wheel and affixed to said second optical unit, wherein the diameter of said first driving wheel being of a predetermined multiple of the diameter of said second driving wheel; and a power means for driving said first driving wheel and said second driving wheel to thereby move said first optical unit and said second optical unit, so as to maintain the optical path from the document to said lens unit at a fixed length.

2. The optical scanning apparatus of claim 1, wherein the diameter of said first driving wheel is two times greater than the diameter of said second driving wheel.

3. The optical scanning apparatus of claim 1, wherein the diameter of said first passive wheel is the same as the diameter of said first driving wheel, and the diameter of said second passive wheel is the same as the diameter of said second driving wheel.

4. The optical scanning apparatus of claim 1, wherein said first driving wheel is arranged with said second driving wheel on the same axis.

5. The optical scanning apparatus of claim 1, wherein said first driving wheel is operatively coupled to said second driving wheel by at least one wheel.

6. The optical scanning apparatus of claim 1, wherein said first and second transmission members are each selected from a belt, a chain or a steel string.

7. The optical scanning apparatus of claim 6, wherein said belt is a timing belt.

8. The optical scanning apparatus of claims 1, wherein said first and second driving wheels and said first and second passive wheels are each a gear.

9. The optical scanning apparatus of claim 1, wherein a guide rod is further provided in said casing for guiding said first optical unit and said second optical unit.

10. The optical scanning apparatus of claim 1, wherein said first optical unit includes a first support panel, a light source affixed on said first support panel, a first mirror affixed on said first support panel, a first fixture attached to one end of said first support panel, and a first guide piece attached to the other end of said first support panel.

11. The optical scanning apparatus of claim 1, wherein said second optical unit includes a second support panel, a second mirror affixed on said second support panel, a third mirror affixed on said second support panel, a second fixture attached to one end of said second support panel, and a second guide piece attached to the other end of said second support panel.

\* \* \* \* \*